United States Patent [19]

Harris et al.

[11] Patent Number: 4,457,621
[45] Date of Patent: Jul. 3, 1984

[54] RANGEFINDER

[75] Inventors: Jeffrey J. Harris; David I. Greenwood, both of Bristol, England

[73] Assignee: British Aerospace, Weybridge, England

[21] Appl. No.: 140,780

[22] Filed: Apr. 16, 1980

Related U.S. Application Data

[63] Continuation-in-part of Ser. No. 915,123, Jun. 13, 1978, abandoned.

[30] Foreign Application Priority Data

Jun. 17, 1977 [GB] United Kingdom ............... 25543/77

[51] Int. Cl.³ .......................... G01C 3/08; G01B 11/26
[52] U.S. Cl. ................................... 356/5; 250/203 R;
350/6.2; 350/358; 356/152
[58] Field of Search ........................... 356/5, 141, 152;
350/6.2, 358; 250/203 R

[56] References Cited

U.S. PATENT DOCUMENTS 3,514,534  5/1970  Korpel ................................ 350/358
3,565,528  2/1971  Witte ..................................... 356/5
3,644,043  2/1972  Jones et al. ..................... 250/203 R
4,025,193  5/1977  Pond et al. ......................... 356/152
4,063,819 12/1977  Hayes ............................. 250/203 R

FOREIGN PATENT DOCUMENTS 1136272 12/1968 United Kingdom .
1334123 10/1973 United Kingdom .

OTHER PUBLICATIONS

NASA Tech. Brief 68-10311, Aug. 1968.

Primary Examiner—S. C. Buczinski
Attorney, Agent, or Firm—Cushman, Darby & Cushman

[57] ABSTRACT

A laser rangefinder including a reflector carried by a rotatable support and arranged to repetitively nod in elevation for deflecting the beam from a laser generator at an instant elevational angle dependent on the instant elevational position of the reflector so that the elevational nod of the reflector and rotation of the support produce a helical scan pattern. A deflector positioned between the beam generator and reflector additionally deflects the beam before it impinges on the reflector to direct the beam toward a target regardless of the instantaneous elevational position of the nodding reflector. A beam receiver receives via the reflector any beam reflected back from a target hit by an outgoing beam. The rangefinder is combined with a surveillance scanner to form a surveillance system.

31 Claims, 3 Drawing Figures

RELATIVE FIELDS OF VIEW ically, the

RANGEFINDER

RELATED APPLICATION

This is a continuation-in-part of our copending parent application Ser. No 915,123 filed Jun. 13, 1978, abandoned upon the filing hereof.

BACKGROUND OF THE INVENTION

In any surveillance system, in order to properly assess the threat of a potential target, the range to that target is generally required. In surveillance systems employing a passive surveillance scanner, such as an infra-red detector, range information of sufficient accuracy can only be obtained by the use of a separate rangefinder. It is also highly desirable that the use of such a separate rangefinder not disclose the existence of the surveillance to a potential enemy target.

The present invention relates to a laser rangefinder for use in a surveillance system of the kind in which a passive surveillance scanner is rotated in azimuth and, at the same time, is caused to nod in elevation so as to produce an azimuth-elevational scan pattern.

Use of a rangefinder in conjunction with a passive surveillance scanner in a surveillance system gives rise to two competing requirements. On the one hand, if the rangefinder is to provide the same elevation coverage that the surveillance scanner provides, the divergence angle of the beam emitted from the rangefinder should be at least equal to the divergence angle of the scanner which might be, for example, of the order of 45 milliradians. On the other hand, in order to obtain maximum range performance from the rangefinder beam, the divergence angle of the rangefinder beam should be as small as possible, for example, of the order of 3 milliradians.

In order to utilize a narrow divergence rangefinder beam, it is necessary to be able to rapidly deflect the rangefinder beam in elevation within the relatively wider field of view of the surveillance scanner. With such rapid deflection, it would be possible to cause the rangefinder beam to impinge on a target anywhere within the field of view of the surveillance scanner. The requirement for a rapid ranging response time after detection, together with the need to deflect the rangefinder's emitted laser beam, imposes severe mechanical restraints on the nodding reflector and in the rangefinder.

It is therefore an object of the present invention to provide a rangefinder for use in a passive surveillance system, the rangefinder being capable of rapidly deflecting its rangefinder beam relative to the instantaneous position of its reflector by non-mechanical means.

SUMMARY OF THE INVENTION

There is therefore provided a laser rangefinder for use in conjunction with a surveillance scanner. The surveillance scanner is, in essence, an infra-red target detection means arranged to automatically trigger a laser beam generator within the laser rangefinder when the surveillance scanner detects a target. The surveillance scanner further provides an elevation signal to a beam elevation deflecting means within the laser rangefinder to change the elevational angle of its output laser beam so as to direct it to the target detected by the surveillance scanner.

The laser rangefinder includes (a) a nodding reflector, (b) a laser beam generator arranged to direct its beam on to the nodding reflector, the nodding reflector being arranged automatically to rotate and to nod in elevation whereby to produce an azimuth-elevational beam scan pattern, (c) non-mechanical beam elevation deflection means positioned in the path of the beam between the beam generator and the nodding reflector for additionally and instantly deflecting the beam in elevation relative to the instantaneous elevational position of the nodding reflector, and (d) a beam receiver so positioned as to receive via the nodding reflector any beam reflected back from a target picked up by the outgoing beam.

The non-mechanical beam elevation deflection means receives an elevation signal from the surveillance scanner which is an infra-red target detection means. This elevation signal indicates the elevation angle of a target detected by the surveillance scanner. The surveillance scanner also provides a signal for triggering the laser beam generator within the laser rangefinder.

Thus there is provided a laser rangefinder arrangement comprising, in combination, (a) a nodding reflector, (b) a laser beam generator arranged to direct its beam onto the nodding reflector, the nodding reflector being arranged automatically to rotate and to nod in elevation whereby to produce an azimuth-elevational beam scan pattern, (c) non-mechanical beam elevation deflection means positioned in the path of the beam between the beam generator and the nodding reflector for additionally and instantly deflecting the beam in elevation relative to the instantaneous elevational position of the nodding reflector, (d) a beam receiver so positioned as to receive via the nodding reflector any beam reflected back from a target picked up by the outgoing beam, and (e) infra-red target detection means arranged automatically to trigger the laser beam generator when a target is detected and to apply a signal to the beam elevation deflecting means whereby to change the instant elevational angle of the beam so as to direct the beam on to the target regardless of the instant elevational position of the nodding reflector.

According to a further feature of the invention, the beam elevation deflection means comprises an acousto-optic deflector.

BRIEF DESCRIPTION OF THE DRAWINGS

Many of the attendant advantages of the present invention will be readily apparent as the invention becomes better understood by reference to the following detailed description and the appended claims, when considered in conjunction with the accompanying drawings, wherein:

DETAILED DESCRIPTION OF THE DRAWINGS

Figure 1:
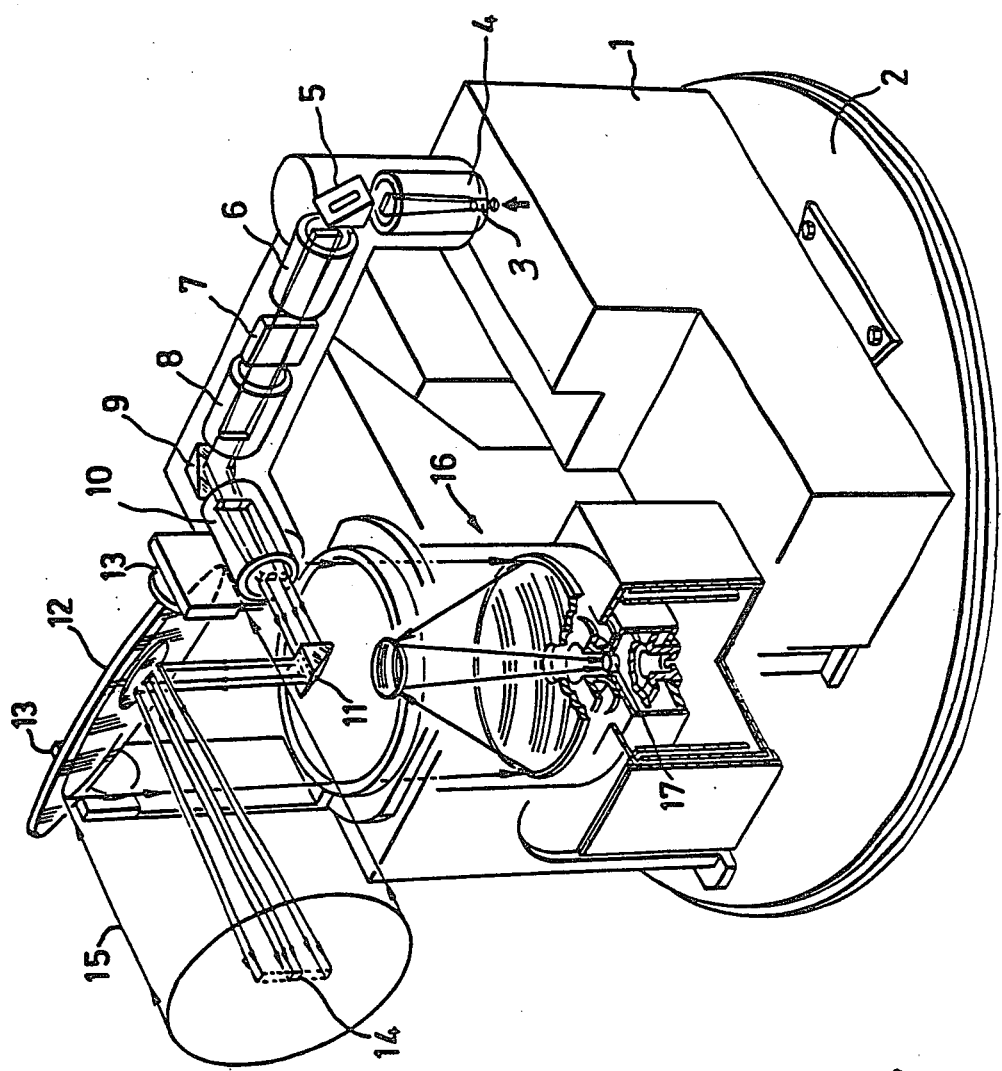
FIG. 1 is a cut-away pictorial view of the rangefinder according to the present invention.

Referring now to the figures, wherein like reference numerals designate like or corresponding parts throughout, FIG. 1 is a diagram of the rangefinder according to the present invention. A laser 1 produces a beam 3 of pulses each having an energy level of 100 mJ and a wavelength of 1.064 μm. Laser 1 is mounted on a rotatable azimuth table 2 so as to direct beam 3 upwards through a cylindrical telescope 4. Within cylindrical telescope 4, the cross-section of the beam is converted from a circular shape to a rectangular shape. After leaving cylindrical telescope 4, the beam passes through a right angle prism 5 to an anamorphic lens 6.

Anamorphic lens 6 converges the beam. The beam, converged by anamorphic lens 6, passes through an acousto-optic deflector 7. On emerging from acousto-optic deflector 7, the beam passes through a further anamorphic lens 8 which re-collimates the beam. The re-collimated beam then passes to a further right-angle prism 9. Right angle prism 9 directs the beam through a further cylindrical telescope 10 to a still further right-angle prism 11. From right angle prism 11, the beam is directed to a nodding reflector 12 mounted in gimbals 13. Telescope 10 produces the desired elevation divergence angle of the beam.

Acousto-optic deflector 7 operates in the Bragg regime and can offer random access deflection times on the order of a few microseconds. Deflector 7 may comprise a crystal with curved acoustic wavefronts produced by a single piezo-electric transducer. Alternatively, deflector 7 may comprise a crystal with plane acoustic wavefronts produced by an array of separate piezo-electric transducers. The deflection angle in either case is a function of the frequency of a signal applied to the transducers. The laser beam is elongated in cross-section to suit the requirements of acousto-optic deflector 7 with respect to its permitted energy density to avoid optical damage and to obtain high defraction efficiency while maintaining a minimum acoustic power drive requirement.

In operation, nodding reflector 12 is driven in synchronism with the azimuth table 2 by means not shown so as to produce a helical scan pattern of the rangefinder's outgoing laser beam indicated by reference numeral 14. A return beam 15, reflected from a target, impinges upon and is deflected by nodding reflector 12 onto a Cassegrain receiver, generally indicated by reference numeral 16, incorporating a sensitive element 17.

To minimize the probability of a target detecting the rangefinder's laser beam, the laser generator is arranged to operate on a single ranging pulse per target, the divergence angle of outgoing laser beam 14 being of the order of 3 milliradians.

Figure 2:
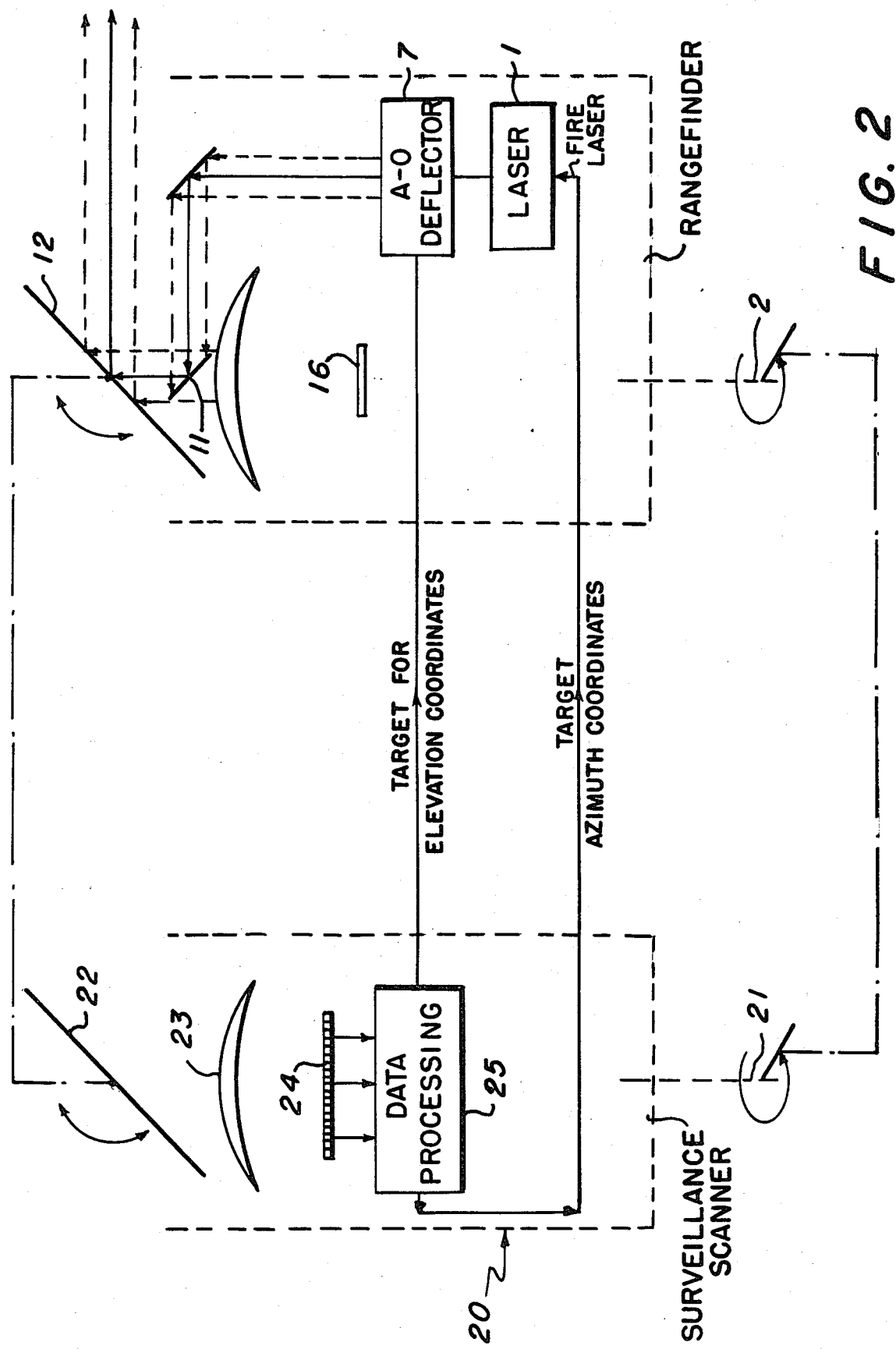
FIG. 2 is a schematic diagram showing the relationship between the rangefinder and the surveillance scanner.

Referring now to FIG. 2, the surveillance scanner, generally indicated by reference numeral 20, includes a rotatable table 21 carrying a slow nodding reflector 22, table 21 and reflector 22 being arranged to operate in synchronism with azimuth table 2 and nodding reflector 12, respectively of the rangefinder.

Surveillance scanner 20 scans for infra-red energy from potential targets. Infra-red energy received from a target impinges upon and is reflected by nodding reflector 22 via a lens 23 onto an infra-red detector array 24. The output of infra-red detector array 24 is conveyed to a data processor 25. Data processor 25 passes target coordinates and a firing signal to the rangefinger.

In operation, when a target is detected by surveillance scanner 20, it provides a firing signal for triggering laser generator 1 to fire at the detected azimuth coordinate (rotatable table 21 of surveillance scanner 20 and azimuth table 2 of the rangefinder rotate in synchronism). Scanner 20 further provides an elevation signal to deflector 7 causing it to deflect the laser beam relative to the instantaneous angle of the nodding reflector 12 into the correct elevation coordinate. The elevation signal provided to acousto-optic deflector 7 is such as to produce the appropriate deflection angle in the acousto-optical deflector to cause outgoing laser beam 14 to assume the proper elevation angle to intercept the target.

Figure 3:
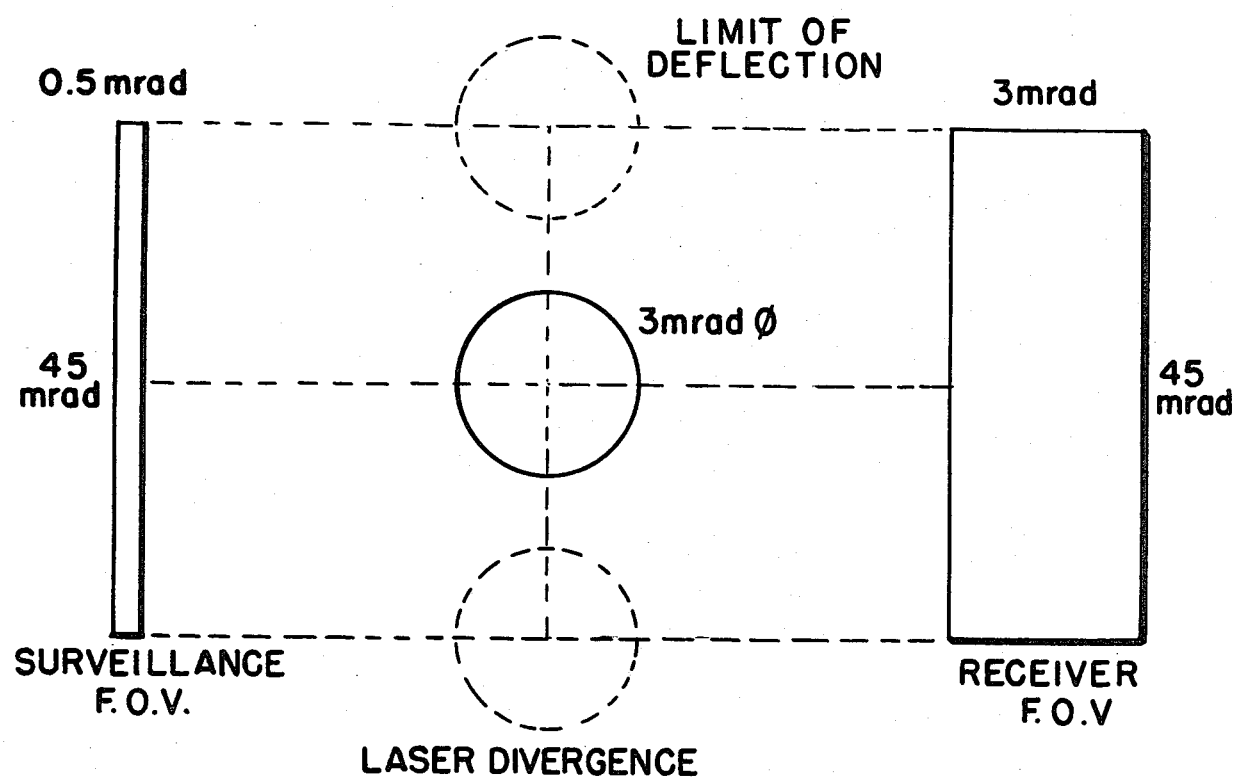
FIG. 3 is a diagram illustrating the relative fields of view of the surveillance scanner and the rangefinder.

As will be seen from FIG. 3, surveillance scanner 20 has a field of view which is 45 milliradians in elevation and 0.5 milliradians in azimuth, whilst the divergence angle of beam 14 from the rangefinder is only 3 milliradians. In order for laser beam 14 to be directed to impinge upon a target within the 45 milliradian elevational field of view of surveillance scanner 20, the arrangement must be capable of deflecting the beam to any orientation within the scanner's elevational field of view.

With no deflection induced by acousto-optical deflector 7, the position of laser beam 14 with respect to the scanner's field of view is depicted by the central solid circle shown in FIG. 3. By deflecting laser beam 14 over a range of ± 22.5 milliradians, the beam can be made to impinge upon any target with the 45 milliradian elevational field of view of scanner 20. The positions of beam 14 with respect to the scanner's elevational field of view for deflections of ± 22.5 milliradians are shown respectively by the upper and lower broken circles in FIG. 3. Thus, the maximum deflection required from the acousto-optic deflector is on the order of plus or minus 22 milliradians.

Receiver 16 of the rangefinder has, of necessity, a large aperture, implying that accurate mechanical deflection of a small receiver field of view in the short time available would be extremely difficult. To alleviate this problem, the receiver is arranged to have a rectangular field of view to match that of the surveillance scanner. The field of view of receiver 16 is represented by the rightmost portion of FIG. 3. The azimuth field of view of receiver 16 is approximately 3 milliradians and the elevational field of view is approximately 45 milliradians.

It will be understood that the appropriate angular lags between the transmitter and receiver axes of the rangefinder will have to be built in to allow for average photon flight time and also between these axes and the axes of the surveillance system to allow for the delay between detection of the target by surveillance scanner 20 and the triggering of laser generator 1 of the rangefinder.

In an alternative arrangement, the same nodding reflector is used both for scanning and for rangefinding.

We claim:
1. A laser rangefinder arrangement for determining range to a target comprising, in combination:
   (a) a nodding reflector,
   (b) a laser beam generator arranged to direct its beam onto the nodding reflector, the nodding reflector being arranged automatically to rotate and to nod repetitively in elevation whereby to produce an azimuth-elevational beam scan pattern,
   (c) non-mechanical beam elevation deflection means positioned in the path of the beam between the beam generator and the nodding reflector for additionally and instantly deflecting the beam in elevation relative to the instantaneous elevational position of the nodding reflector,
   (d) a beam receiver so positioned as to receive via the nodding reflector any beam reflected back from a target picked up by the outgoing beam the received beam indicating the range to the target, and

(e) infra-red target detection means arranged automatically to trigger the laser beam generator when a target is detected and to apply a signal to the beam elevation deflecting means whereby to change the instant elevational angle of the beam so as to direct the beam on to the target regardless of the instant elevational position of the nodding reflector.

2. A laser rangefinder arrangement according to claim 1 wherein the beam elevation deflection means comprises an acousto-optic deflector.

3. A laser rangefinder arrangement according to claim 2 further including optical means for elongating the cross-section of the laser beam in the plane of elevation prior to its passage through the acousto-optic deflector and for restoring the beam to its original cross-section subsequent to its passage through the acousto-optic deflector.

4. A laser rangefinder arrangement according to any of claims 1-3 wherein the laser beam generator is arranged to produce a pulsed beam.

5. A laser rangefinder arrangement according to any of claims 1-3 wherein the target detection means includes a reflector arranged to rotate in azimuth and, at the same time, to nod in elevation whereby to produce an azimuth elevational scan pattern, the nodding reflector of the rangefinder being arranged to operate in synchronism with the reflector of the target detection means.

6. A laser rangefinder arrangement according to claim 4 wherein the target detection means includes a reflector arranged to rotate in azimuth and, at the same time, to nod in elevation whereby to produce an azimuth elevational scan pattern, the nodding reflector of the rangefinder being arranged to operate in synchronism with the reflector of the target detection means.

7. A surveillance system comprising:
a surveillance scanner for detecting a target and generating a surveillance scanner signal responsive thereto, the surveillance scanner signal indicating the elevational angle of the detected target; and
a laser rangefinder for determining the range to the detected target, said laser rangefinder including:
   (a) a nodding reflector.
   (b) a laser beam generator arranged to direct its beam onto the nodding reflector, the nodding reflector being arranged automatically to rotate in azimuth and to nod repetitively elevation whereby to produce an azimuth-elevational beam scan pattern,
   (c) non-mechanical beam elevation deflection means positioned in the path of the beam between the beam generator and the nodding reflector for additionally and instantly deflecting the beam in elevation relative to the instantaneous elevational position of the nodding reflector, the deflection of the beam by the non-mechanical beam deflection means being responsive to the surveillance scanner signal from the surveillance scanner, and
   (d) a beam receiver so positioned as to receive via the nodding reflector any beam reflected back from a target illuminated by the outgoing beam.

8. A surveillance system according to claim 7 wherein said surveillance scanner further generates a target detection signal for triggering said laser beam generator.

9. A surveillance system according to either of claims 7 or 8 wherein said beam elevation deflection means comprises an acousto-optic deflector.

10. A surveillance system according to either of claims 7 or 8 wherein said laser rangefinder further includes optical means for elongating the cross-section of the laser beam in the plane of elevation prior to its passage through the non-mechanical beam elevation deflection means and for restoring the beam to its original cross-section subsequent to its passage through the non-mechanical beam elevation deflection means.

11. A surveillance system according to either of claims 7 or 8 wherein said laser beam generator is arranged to produce a pulsed beam.

12. A surveillance system according to either of claims 7 or 8 wherein said surveillance scanner includes a reflector arranged to rotate in azimuth and, at the same time, to nod in elevation to produce an azimuth elevational scan pattern, the reflector of said laser rangefinder being arranged to operate in synchronism with the nodding reflector of said surveillance scanner.

13. A surveillance system comprising:
a surveillance scanner that scans in azimuth and, at the same time, scans in elevation so as to achieve an azimuth elevation scan pattern; and
a laser rangefinder comprising a rotatable support rotating in synchronism with the azimuth scan of said surveillance scanner, a repetitively nodding reflector operating in synchronism with the elevational scan of said surveillance scanner, a laser beam generator arranged to direct its beam onto said nodding reflector, the motions of said rotatable support and nodding reflector producing a beam scan pattern, beam deflection means positioned in the path of the beam between the beam generator and the nodding reflector for additionally deflecting the beam in elevation relative to the instantaneous elevational position of said nodding reflector, and a beam receiver so positioned as to receive via the nodding mirror any beam reflected back from a target irradiated by the outgoing beam.

14. A surveillance system according to claim 13 wherein said surveillance scanner generates a target detection signal for triggering said laser beam generator.

15. A surveillance system according to claim 13 wherein said beam deflection means comprises an acousto-optic deflector.

16. A surveillance system according to claim 13 wherein said laser rangefinder further includes optical means for elongating the cross-section of the laser beam at a plane of elevation prior to its passage through the beam deflection means and for restoring the beam to its original cross-section subsequent to its passage through the beam deflection means.

17. A surveillance system according to claim 13 wherein the laser beam generator is arranged to produce a pulsed beam.

18. A laser rangefinder comprising a rotatable support carrying
   (a) a repetitively nodding reflector,
   (b) a laser beam generator arranged to direct its beam onto said nodding reflector, the nodding reflector being arranged automatically to nod in elevation with respect to said support for deflecting said beam in elevation from said reflector at an instant elevational angle dependent on the instantaneous elevational position of said reflector the elevational nod of said nodding reflector and the rotation of said support producing an azimuth-elevational scan pattern, (c) beam elevation deflection means positioned in the path of the beam between the beam generator and the nodding reflector for additionally and instantly deflecting the beam in elevation to change said instant elevational angle of beam deflection to a predetermined elevational angle associated with a given target to direct the beam outgoing from said reflector to said target regardless of the instantaneous elevational position of said nodding reflector, and (d) a beam receiver so positioned as to receive via the nodding reflector any beam reflected back from said given target when picked up by said outgoing beam.

19. A laser rangefinder according to claim 18 wherein said laser beam generator produces a laser beam of predetermined duration in response to a triggering signal coupled thereto.

20. A laser rangefinder for measuring distance to a target said rangefinder for use in a passive surveillance system wherein a surveillance scanner is rotated in azimuth and caused to nod in elevation so as to achieve a scan pattern, said laser rangefinder comprising:

a rotatable support;
a laser beam generator;
a repetitively nodding reflector rotated by said rotatable support for receiving a laser beam generated by said laser beam generator and reflecting said laser beam toward said target, the nodding of said nodding reflector and the rotation of said nodding reflector by said rotatable support producing a scan pattern;
beam elevation deflection means, positioned along the path that would be followed by a laser beam generated by said laser beam generator and propagating toward said nodding reflector, for additionally and instantly deflecting the beam in elevation to change the instant elevational angle that said beam would have had as determined only by the elevation of said nodding reflector in the absence of said beam elevation deflection means, said beam elevation deflection means causing said laser beam to have a predetermined elevational angle associated with said target to direct the beam to said target regardless of the instantaneous elevational position of said nodding reflector; and
a receiver for receiving said laser beam after being reflected from said target.

21. A laser rangefinder according to claim 20 wherein said beam elevation deflection means is an acoustooptic deflector.

22. A laser rangefinder according to claim 20 further including an anamorphic lens for converging the laser beam generated by said laser beam generator prior to its passing through said beam elevation deflection means.

23. A laser rangefinder according to claim 22 further including a second anamorphic lens for recollimating the laser beam after it passes through said beam elevation deflection means.

24. A laser rangefinder according to claims 20, 21, 22, or 23 wherein said receiver is a Cassagrain receiver.

25. A laser rangefinder according to claims 20, 21, 22 or 23 wherein said laser beam generator is arranged to produce a pulsed beam.

26. A laser rangefinder comprising:

a rotatable support;
a repetitively nodding reflector, mechanically coupled to said rotatable support, the nod of said nodding reflector and the rotation of said rotatable support providing a scan pattern;
a laser beam generator arranged to direct its beam onto said nodding reflector, causing said beam to be reflected at an elevational angle dependent upon the instantaneous elevational position of said reflector;
beam elevation deflection means positioned in the path of the beam between said laser beam generator and said nodding reflector for additionally and instantly deflecting the beam in elevation to change the said instant elevational angle of beam deflection ot a predetermined elevational angle associated with a given target to direct the beam outgoing from said reflector to said target regardless of the instantaneous elevational position of said nodding reflector; and
a beam receiver so positioned as to receive via the nodding reflector any beam reflected back from said given target when picked up by said outgoing beam.

27. A laser rangefinder according to claim 26 wherein said beam elevation deflcetion means is an acoustooptic deflector.

28. A laser rangefinder according to claim 26 further including optical means for elongating the cross-section of the laser beam in the plane of elevation prior to its passage through the beam elevation deflection means and for restoring the beam to its original cross-section subsequent to its passage through the beam elevation deflection means.

29. A laser rangefinder according to claim 28 wherein said optical means includes at least one anamorphic lens.

30. A laser rangefinder according to claims 26, 27, 28 and 29 wherein said beam receiver is a Cassagrain receiver.

31. A laser rangefinder according to claims 26, 27, 28 or 29 wherein said laser beam generator is arranged to produce a pulsed beam.

* * * * *